United States Patent
Du et al.

(10) Patent No.: US 8,738,797 B2
(45) Date of Patent: May 27, 2014

(54) METHOD AND APPARATUS FOR RATE MATCHING

(75) Inventors: Fanping Du, Guangdong Province (CN); Xiaoming Zhu, Guangdong Province (CN); Jianping Tao, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 291 days.

(21) Appl. No.: 13/063,367

(22) PCT Filed: Aug. 20, 2009

(86) PCT No.: PCT/CN2009/073386
§ 371 (c)(1),
(2), (4) Date: Mar. 21, 2011

(87) PCT Pub. No.: WO2010/028567
PCT Pub. Date: Mar. 18, 2010

(65) Prior Publication Data
US 2011/0191490 A1  Aug. 4, 2011

(30) Foreign Application Priority Data

Sep. 12, 2008  (CN) .......................... 2008 1 0215682

(51) Int. Cl.
*G06F 15/16* (2006.01)
(52) U.S. Cl.
USPC ....................................................... 709/232
(58) Field of Classification Search
USPC ....................................................... 709/232
See application file for complete search history.

(56) References Cited

U.S. PATENT DOCUMENTS 6,580,762 B1 *  6/2003  Tsumura ....................... 375/295
6,601,214 B1 *  7/2003  Hammons, Jr. .............. 714/790

(Continued)

FOREIGN PATENT DOCUMENTS

| CN | 101079678 A | 11/2007 |
| CN | 101155011 A | 4/2008 |
| CN | 101217341 A | 7/2008 |

OTHER PUBLICATIONS

3GPP, Technical Specification Group Radio Access Network; Multiplexing and channel coding (FDD) (3GPP TS 25.212 v7.0.0), Mar. 31, 2006 : WWW.3GPP.ORG.*
3GPP, "3rd Generation Partnership Project; Technical Specification Group Radio Access Network; Multiplexing and channel coding ", "Accessed online at http://www.quintillion.co.jp/3GPP/Specs/25212-700.pdf", 2006, pp. 37-38.

*Primary Examiner* — Kevin Bates
*Assistant Examiner* — Ronak Patel
(74) *Attorney, Agent, or Firm* — Hultquist, PLLC; Steven J. Hultquist; Mary B. Grant

(57) ABSTRACT

A method and apparatus for rate matching are disclosed by the invention, wherein the method includes: determining an initial value according to the total amount of data in the data stream and a predetermined initial offset value; performing an accumulation processing and an even distribution processing on said initial value and the amount of the data needing rate matching; determining the data needing rate matching from the data stream according to the processing result. With the solution proposed by the invention, a rate matching method using even distribution principle and accumulation principle can be determined. The method is simple, clear and accurate, and can be understood easily.

2 Claims, 2 Drawing Sheets

(56) References Cited

U.S. PATENT DOCUMENTS

| | | | |
|---|---|---|---|
| 6,744,744 B1 * | 6/2004 | Tong et al. | 370/320 |
| 6,751,772 B1 * | 6/2004 | Kim et al. | 714/786 |
| 6,996,114 B2 * | 2/2006 | Sebire | 370/403 |
| 7,007,216 B2 * | 2/2006 | Hong | 714/748 |
| 7,069,356 B2 * | 6/2006 | Meyer et al. | 710/52 |
| 7,227,890 B2 * | 6/2007 | Moon et al. | 375/222 |
| 7,987,414 B2 * | 7/2011 | Kim et al. | 714/790 |
| 8,144,615 B2 * | 3/2012 | Hong | 370/252 |

* cited by examiner

US 8,738,797 B2

METHOD AND APPARATUS FOR RATE MATCHING

CROSS-REFERENCE TO RELATED APPLICATIONS

This application is a U.S. national phase application under the provisions of 35 U.S.C. §371 of International Patent Application No. PCT/CN09/73386 filed Aug. 20, 2009, which in turn claims priority of Chinese Patent Application No. 200810215682.2 filed Sep. 12, 2008. The disclosures of such international patent application and Chinese priority patent application are hereby incorporated by reference herein in their respective entireties, for all purposes.

FIELD OF THE INVENTION

The present invention relates to communication field, in particular to a method and an apparatus for rate matching.

BACKGROUND OF THE INVENTION

In 3G radio communication field, in order to adapt the bit rate of transmission channel, the bit of a bit sequence is repeated or punctured, which is referred as to rate matching.

3 Gpp 25.212 specifies an algorithm of rate matching, the algorithm for solving the rate matching pattern will be described as below.

The input bit sequence before rate matching is denoted by $x_{i1}, d_{i2}, x_{i3}, \ldots x_{iX_i}$, wherein the parameters $X_i$, $e_{ini}$, $e_{plus}$, and $e_{minus}$ denote data amount, the initial offset of the rate matching, the update step size of the rate matching, and the adjustment step size of the rate matching respectively.

The algorithmic for solving the rate matching pattern by pseudo-code is:

```
if puncturing is to be performed
    e = e_ini              -- initial error between current and desired
                              puncturing ratio
    m = 1                  -- index of current bit
    do while m <= X_i
        e = e - e_minus       -- update error
        if e <= 0 then        -- check if bit number m should be punctured
            set bit x_{i,n} to δ where δ ∉ {0, 1}
            e = e + e_plus    -- update error
        end if
        m = m + 1             -- next bit
    end do
else
    e = e_ini              -- initial error between current and desired
                              puncturing ratio
    m = 1                  -- index of current bit
    do while m <= X_i
        e = e - e_minus       -- update error
        do while e <= 0       -- check if bit number m should be repeated
            repeat bit x_{i,n}
            e = e + e_plus    -- update error
        end do
        m = m + 1             -- next bit
    end do
end if
```

Wherein, the repeated bit is placed directly after the original one.

Current rate matching algorithm is excessively abstract, thus hard to be understood and realized.

SUMMARY OF THE INVENTION

The present invention is provided aiming at the problem in the prior art that the rate matching algorithm is excessively abstract, hard to be understood and realized. So, the present invention aims at providing a method and an apparatus for rate matching aiming to solve the above-mentioned problem.

In order to achieve the above-mentioned aim, according to one aspect of the present invention, a method for rate matching is provided.

A method for rate matching according to one embodiment of the present invention comprises: determining an initial value according to the total amount of data in the data stream and a predetermined initial offset value; performing an accumulation processing and an even distribution processing on the initial value and the amount of the data needing rate matching; determining the data needing rate matching from the data stream according to the processing result.

In the above, the accumulation processing and the even distribution processing on the initial value and the amount of the data needing rate matching comprise: Step 1, summing the initial value and the amount of the data needing rate matching; Step 2, updating the initial value with the summing result and determining whether the initial value is greater than the total amount of data in the data stream, and going to Step 1 in case of a negative determination result, going to Step 3 in case of a positive determination result; Step 3, taking the current data in the data stream as the data needing rate matching; Step 4, taking the difference between the summing result and the total amount of data in the data stream as the initial value, then going to Step 5; Step 5, determining whether the current data is the last data of the data stream, going to Step 1 in case of a negative determination result, otherwise ending the processing.

According to another aspect of the present invention, an apparatus for rate matching is provided.

An apparatus for rate matching according to one embodiment of the present invention comprises: a first processing unit, configured to determine an initial value according to the total amount of data in a data stream and the predetermined initial offset value; a second processing unit, configured to perform accumulation processing and even distribution processing on the initial value and the amount of the data needing rate matching; a determination unit, configured to determine the data needing rate matching from the data stream according to the processing result of the second processing unit.

In the above, the second processing module comprises: an adder, configured to sum the initial value and the amount of the data needing rate matching; a first judgment module, configured to update the initial value with the summing result and determine whether the initial value is greater than the total amount of the data in the data stream; an extractor, configured to take the current data in the data stream as the data needing rate matching; a decision module, configured to take the difference between the summing result and the total amount of data as the initial value; a second judgment module, configured to determine whether the current data is the last data of the data stream.

With at least one of the above technical solution, through the present invention, the rate matching method determined by even distribution principle and accumulation principle is simple, accurate, and easy to be understood, and thus, the problem of over abstract in prior rate matching algorithm is solved.

Other features and advantages of the present invention will be expatiated in the following sections of the specification, and will be apparent upon review thereof to those skilled in the art, or appreciated through implementing the present invention. The objects and other advantages can be realized and obtained through the structures specified in the present specification, claims, and drawings.

BRIEF DESCRIPTION OF THE DRAWINGS

The drawings in the specification provide a further understanding to the present invention and constitute a part of the application. The exemplary embodiments of the present invention and the explanation thereof are given by way of illustration only, and thus are not limitative of the present invention, and wherein.

DETAILED DESCRIPTION OF THE EMBODIMENTS

Functionality Overview

Aiming to the problem of over abstract in prior rate matching algorithm, the embodiments of the present provide a rate matching method and apparatus. In the embodiments of the present invention, the initial value is determined according to the total amount of data in the data stream and the predetermined initial offset value, after that, the initial value and the amount of the data needing rate matching are performed with an accumulation processing and an even distribution processing, and the data to be performed with rate matching is determined from the data stream according to above processing result.

The preferred embodiments of the present invention will be described in detail hereinafter with drawings which constitute a part of the application and illustrate the principle of the present invention together with the embodiments of the present invention. The embodiments and features thereof can be combined with each other if no conflict is caused.

According to the embodiments of the present invention, a rate matching method is provided.

Figure 1:
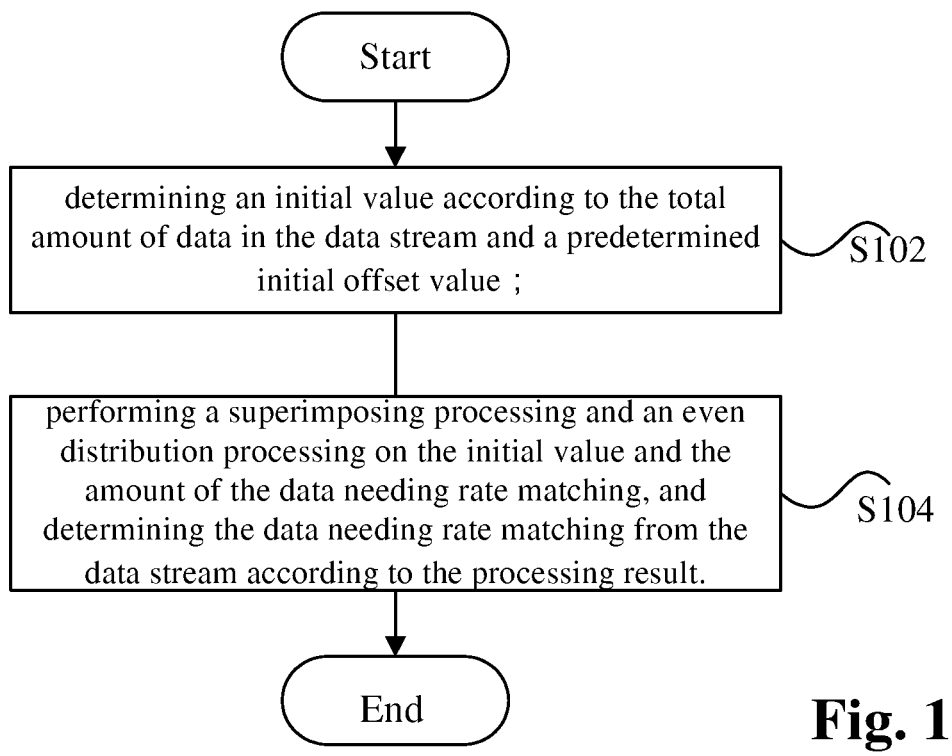
FIG. 1 is the flow chart of the rate matching method according to an embodiment of the present invention.

FIG. 1 is the flow chart of the rate matching method according to an embodiment of the present invention as shown in FIG.1, the method comprises the following steps:

Step S102, determining an initial value according to the total amount of data in the data stream and a predetermined initial offset value; and Step S104, performing an accumulation processing and an even distribution processing on the initial value and the amount of the data needing rate matching, and determining the data needing rate matching from the data stream according to the processing result.

In the above, the accumulation processing and even distribution performed on above processing factors comprises:

Step 1, summing the initial value and the total amount of the data needing rate matching;

Step 2, updating the initial value with the summing result and determining whether the initial value is greater than the total amount of the data in the data stream;

The process returns to Step 1 when the determination result is no, and goes to Step 3 when the determination result is yes;

Step 3, taking the current data in the data stream as the data needing rate matching;

Step 4, taking the difference between the summing result and the total amount of the data of the data stream as the initial value, then going to Step 5;

Step 5, determining whether the current data is the last one of the data stream, going to Step 1 in case of a negative determination result, otherwise ending the processing.

Based on the technology scheme provided in the embodiment of the present invention, the rate matching method determined by even distribution principle and accumulation principle is simple, accurate, and easy to be understood.

The basic idea of the present invention can be expressed as follows.

The rate matching parameters Xi, $e_{ini}$, $e_{plus}$, and $e_{minus}$, can be obtained according to the related protocols, wherein Xi is the bit amount before the rate matching, $e_{minus}$ can be regarded as a product of the bit amount to be punctured or repeated and a coefficient 'a', $e_{plus}$ can be regarded as a product of the bit amount before rate matching and a coefficient 'a', $e_{ini}$ is one initial offset. The rate matching pattern denotes how the bit puncturing and repetition are performed according to the parameters, or how the punctured or repeated data are distributed in the data sequence (i.e., above-mentioned data stream).

First, it is assumed that $e_{ini}$ is zero, 'a' is 1 in an embodiment of the present invention, that is to say, $e_{minus}$ is the amount of the bits to be punctured or repeated, $e_{plus}$ is the bit amount before the rate matching.

In order to improve the decoding performance in the receiving terminal, according to the probability distribution principle, the data stream shall meet even distribution principle before rate matching, that is to say, puncturing and bit repetition shall be performed as even as possible, so as to minimize information loss at the receiving terminal.

The problems existed in above rate matching are that it is required to determine the amount of the bit to be transmitted, $e_{plus}$, the amount of the bit to be punctured or repeated, $e_{minus}$, and how to make $e_{minus}$ bits distributed evenly in $e_{plus}$, wherein, one way to solve these problems is utilizing probability accumulation principle.

Because it is required to puncture or repeat $e_{minus}$ bits among $e_{plus}$ bits, the probability for each bit being punctured or repeated is $e_{minus}/e_{plus}$. The probability of each bit being punctured or repeated is equal, so the accumulation principle is satisfied, thus the possibility of $n_{th}$ bit being punctured or repeated is $(n*(e_{minus}/e_{plus}))$modulo 1, herein, wherein modulo 1 means that when the probability is greater than 1, the bit will be punctured or repeated.

Based on the above concept, the even distribution principle and the possibility accumulation principle, the rate matching method utilizing pseudo-code according to an embodiment of the present invention is shown as below:

```
e = 0                              -- the initial puncturing probability is zero
m = 1                              -- bit sequence number
do while m <= X_i
   e = e + e_minus/e_plus          -- probability accumulation
   if e >= 1 then                  -- if the probability is greater then 1,
                                      puncturing
      set bit x_{i,m} to δ where δ ∉ {0, 1}
      e = e - 1                    -- mod 1
   end if
   m = m + 1                       -- next bit
end do
else
   e = 0                           -- the initial repetition probability is zero
   m = 1                           -- bit sequence number
   do while m <= X_i
      e = e + e_minus/e_plus       -- probability accumulation
      do while e >= 1 then         -- if the probability is greater then 1,
                                      repeating
         repeat bit x_{i,m}
```

-continued

```
        e = e − 1              -- mod 1
    end do
        m = m + 1              -- next bit
    end do
end if
```

The process ends after $e_{minus}$ bits are determined to be performed with rate matching.

In the above, the e=0 is the predetermined initial offset value, $e_{minus}$ is the amount of data needing rate matching, $e_{plus}$ is the total amount of data in the data stream.

In practice, the probability $e_{minus}/e_{plus}$ can be simplify to a prime fraction so as to not be influenced by 'a', in addition, $e_{ini}$ is set as the initial probability of puncturing or repetition, the rate matching method utilizing pseudo-code according to the above embodiment of the present invention can be modified to magnify e by $e_{plus}$ times. The modified rate matching method utilizing pseudo-code is shown as below:

```
if puncturing is to be performed
    e = e_plus − e_ini         -- initial value
    m = 1                      -- bit sequence number
    do while m <= X_i
        e = e + e_minus         -- probability summing
        if e >= e_plus then     -- if the summing result is greater than the total amount of the data of
                                   the data stream, then rate matching is performed
            set bit x_{i,m} to δ where δ ∉ {0, 1}
            e = e − e_plus      -- taking the difference between the summing result and the total amount
                                   of the data of the data stream as the initial value
        end if
        m = m + 1              -- next bit
    end do
else
    e = e_plus − e_ini         -- initial value
    m = 1                      -- bit sequence number
    do while m <= X_i
        e = e + e_minus         -- probability summing
        do while e >= e_plus    -- if the summing result is greater than the total amount of the data of
                                   the data stream, then rate matching is performed
            repeat bit x_{i,m}
            e = e − e_plus      -- taking the difference between the summing result and the total amount
                                   of the data of the data stream as the initial value
        end do
        m = m + 1              -- next bit
    end do
end if
```

As seen from above algorithm, based on the physical meaning of rate matching, the algorithm utilizes probability accumulation algorithm and modulo 1 operation to realize rate matching according to even distribution principle and probability accumulation principle, which is completely different from the algorithm specified by protocols in form. Moreover, the essence of the algorithm is that each bit has equal probabilities for puncturing or repetition, the probability accumulation principle is satisfied. And the punctured or repeated bits are evenly distributed in the bit sequence. Both the probability of being punctured or being repeated for each bit are $e_{minus}/e_{plus}$, the probability that the nth bit is punctured or repeated is $(n*(e_{minus}/e_{plus}))$ modulo 1, that is said, probability accumulation and modulo 1.

According to the embodiments of the present invention, an apparatus for rate matching is provided.

Figure 2:
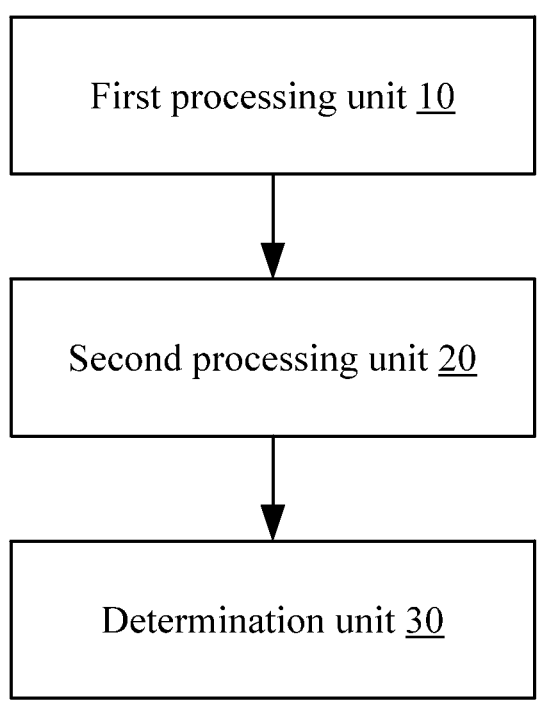
FIG. 2 is the frame diagram of the structure of the rate matching apparatus according to an embodiment of the present invention.

FIG. 2 is the frame diagram of the structure of the apparatus for rate matching according to an embodiment of the present invention, as shown in FIG. 2, the apparatus comprises: a first processing unit 10, a second processing unit 20, and a determination unit 30.

The functions of each module will be described as below.

The first processing module 10 is configured to determine the initial value according to the total amount of data of the data stream, A, and the predetermined initial offset value; the second processing unit 20 is configured to perform an accumulation processing and an even distribution processing on the initial value and the amount of data needing rate matching; the determination unit 30 is configured to decide the data needing rate matching from the data stream according to the processing result by the second processing unit.

Figure 3:
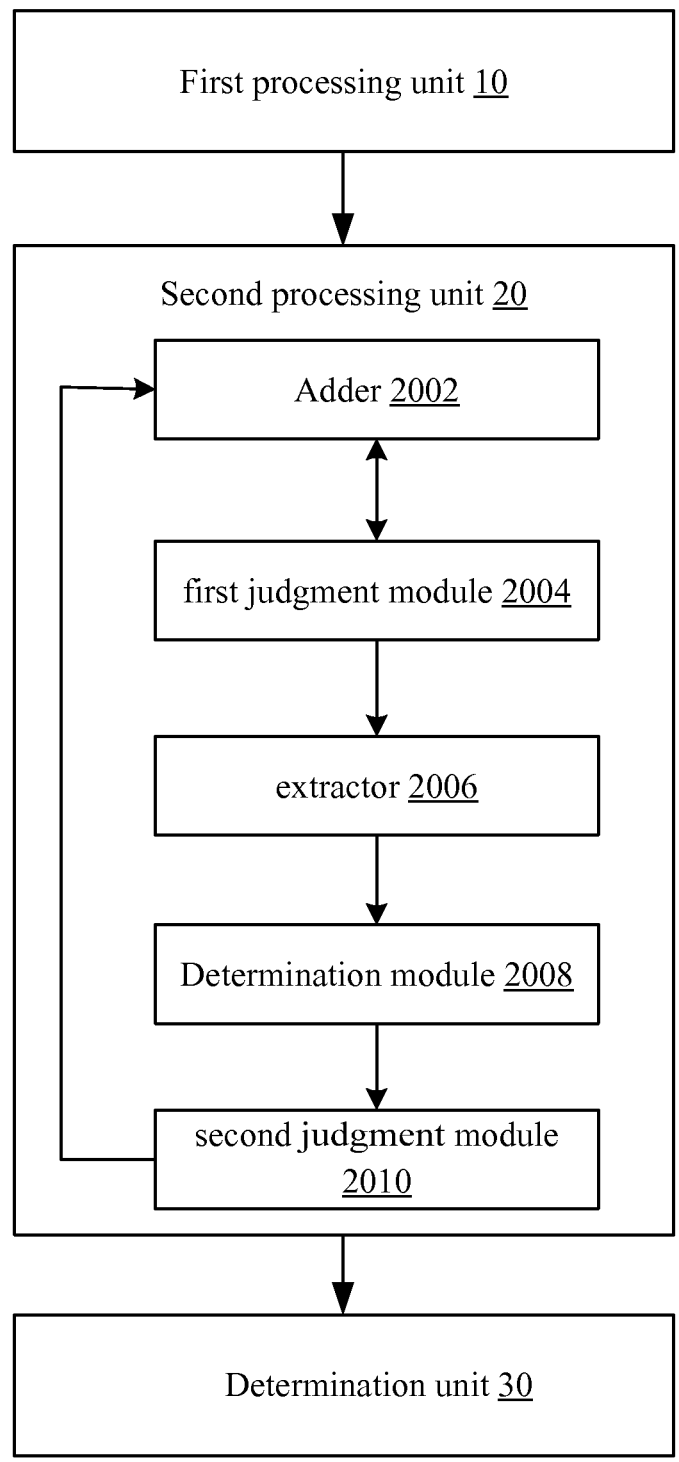
FIG. 3 is the frame diagram of the detailed structure of the rate matching apparatus according to an embodiment of the present invention.

In particular, as shown in FIG. 3, the second processing unit 20 may also comprises an adder 2002, a first judgment module 2004, an extractor 2006, a determination module 2008, and a second judgment module 2010. The functions of those modules will be described. The adder 2002 is configured to sum the initial value and the amount of data needing rate matching; the first judgment module 2004 is configured to update the initial value with the summing result and determine whether the initial value is greater than the total amount of data of the data stream; the extractor 2006 is configured to take the current data of the data stream as the data needing rate matching; the determination module 2008 is configured to take the different between the summation result and the total amount of data of the data stream as the initial value; and the second determination module 2010 is configured to determine whether the current data is the last one of the data stream.

As discussed above, with the method and/or apparatus for rate matching of the present invention, the present invention employs the rate matching method determined by even distribution principle and accumulation principle, which is simple, accurate, and easy to be understood. Based on the true physical meaning of the rate matching of the present invention, according to even distribution principle and probability accumulation principle, the present invention provides a pattern algorithm for rate matching, which is different from that specified by protocols in form and procedure, but it offers a completely same result, and has a obvious physical meaning so as to facilitate understanding and realizing by engineers. Thereby, the problem of excessive abstractness of prior rate matching is completely solved.

The descriptions above are only preferable embodiments of the present invention, which are used to restrict the present invention. For those skilled in the art, the present invention may have various alterations and changes. Any amendments, equivalent substitutions, and improvement etc. within the spirit and principle of the present invention are all included in the protection scope of the present invention.

What is claimed is:

1. A method for bit rate matching of transmission channel, wherein the method comprises:
   determining an initial value according to a total amount of data in a data stream of an input bit sequence and a predetermined initial offset value; and
   performing an accumulation processing and an even distribution processing on the initial value and the amount of the data needing rate matching, and determining the data needing rate matching from the data stream according to the processing result;
   wherein the accumulation processing and even distribution processing on the initial value and the amount of the data needing rate matching comprise:
   Step 1, summing the initial value and the amount of the data needing rate matching;
   Step 2, updating the initial value with the summing result, and determining whether the initial value is greater than the total amount of data in the data stream;
   going to Step 1 in case of a negative determination result, and going to Step 3 in case of a positive determination result;
   Step 3, taking the current data in the data stream as the data needing rate matching;
   Step 4, taking the difference between the summing result and the total amount of data in the data stream as the initial value, then going to Step 5; and
   Step 5, determining whether the current data is the last data of the data stream, going to Step 1 in case of a negative determination result, otherwise ending the processing.

2. An apparatus for bit rate matching of transmission channel, wherein the apparatus comprises:
   a first processing unit, configured to determine an initial value according to a total amount of data in a data stream of an input bit sequence and a predetermined initial offset value;
   a second processing unit, configured to perform accumulation processing and even distribution processing on said initial value and said amount of the data needing rate matching; and
   a determination unit, configured to determine said data needing rate matching from the data stream according to the processing result of the second processing unit;
   a processor coupled to a memory, configured to execute the first processing unit, the second processing unit, and the determination unit;
   wherein the second processing module comprises:
   an adder, configured to sum the initial value and the amount of the data needing rate matching;
   a first judgment module, configured to update the initial value with the summation result and determine whether the initial value is greater than the total amount of the data in the data stream;
   an extractor, configured to take the current data in the data stream as the data needing rate matching;
   a decision module, configured to take the difference between the summation result and the total amount of data as the initial value;
   a second judgment module, configured to determine whether the current data is the last data of said data stream.

* * * * *

UNITED STATES PATENT AND TRADEMARK OFFICE
CERTIFICATE OF CORRECTION

PATENT NO. : 8,738,797 B2
APPLICATION NO. : 13/063367
DATED : May 27, 2014
INVENTOR(S) : Fanping Du Page 1 of 1

It is certified that error appears in the above-identified patent and that said Letters Patent is hereby corrected as shown below:

In the Specification

Column 1, Line 29, "xiXi(, wherein" should be --xiXi, wherein--.

Column 3, Line 44, "the present invention as shown" should be --the present invention; as shown--.

Signed and Sealed this
Twenty-third Day of September, 2014

Michelle K. Lee
*Deputy Director of the United States Patent and Trademark Office*